(12) United States Patent
Zuerner

(10) Patent No.: US 9,756,131 B2
(45) Date of Patent: Sep. 5, 2017

(54) LABEL FOR USE IN THE INTERNET OF THINGS

(71) Applicant: Verizon Deutschland GmbH, Frankfurt am Main (DE)

(72) Inventor: Helmut Zuerner, Dortmund (DE)

(73) Assignee: Verizon Deutschland GmbH, Frankfurt (DE)

( * ) Notice: Subject to any disclaimer, the term of this patent is extended or adjusted under 35 U.S.C. 154(b) by 248 days.

(21) Appl. No.: 14/154,490

(22) Filed: Jan. 14, 2014

(65) Prior Publication Data

US 2015/0095478 A1  Apr. 2, 2015

Related U.S. Application Data

(60) Provisional application No. 61/885,431, filed on Oct. 1, 2013.

(51) Int. Cl.
*G06F 15/173* (2006.01)
*H04L 29/08* (2006.01)
*H04L 12/24* (2006.01)

(52) U.S. Cl.
CPC .......... *H04L 67/12* (2013.01); *H04L 41/0866* (2013.01); *H04L 41/32* (2013.01)

(58) Field of Classification Search
None
See application file for complete search history.

(56) References Cited

U.S. PATENT DOCUMENTS

| | | | | |
|---|---|---|---|---|
| 6,205,534 | B1* | 3/2001 | Kamiyama | G06F 9/30014 708/607 |
| 7,917,914 | B2* | 3/2011 | McCoy | H04L 12/2816 700/80 |
| 8,963,692 | B2* | 2/2015 | Sanders | H04L 67/12 340/10.42 |
| 2008/0104212 | A1* | 5/2008 | Ebrom | G04R 20/26 709/222 |

(Continued)

OTHER PUBLICATIONS

OECD, "Machine-to-Machine Communications: Connecting Billions of Devices", OECD Digital Economy Papers, No. 192, OECD Publishing, Jan. 30, 2012, 45 pages.

(Continued)

*Primary Examiner* — Joseph E Avellino
*Assistant Examiner* — Phyllis A Book

(57) ABSTRACT

A device obtains a label from a particular device. The device identifies a first flag, a second flag, a third flag, and a fourth flag from the label. The device determines, based on the first flag, first information indicating a kind of communication used by the particular device. The device determines, based on the second flag, second information indicating a direction the particular device communicates data and/or indicating storage options. The device determines, based on the third flag, third information indicating at least one of service information for the particular device, an energy requirement for the particular device, or a redundancy mechanism for the particular device. The device determines, based on the fourth flag, fourth information indicating an administrative requirement for the particular device. The device manages the particular device or an environment based on at least one of the determined information.

20 Claims, 12 Drawing Sheets

(56) References Cited

U.S. PATENT DOCUMENTS

| | | | | |
|---|---|---|---|---|
| 2013/0159550 A1* | 6/2013 | Vasseur | ............... | H04W 40/248 709/242 |
| 2013/0223275 A1* | 8/2013 | Vasseur | ................ | H04L 45/26 370/254 |
| 2015/0019710 A1* | 1/2015 | Shaashua | .......... | G06F 17/30705 709/224 |
| 2015/0143462 A1* | 5/2015 | Li | .................. | H04W 4/005 726/3 |
| 2015/0189030 A1* | 7/2015 | Li | .................. | H04L 51/18 709/217 |

OTHER PUBLICATIONS

Vint Cerf, "The Internet: Looking Forward", The Internet Protocol Journal, vol. 16, No. 2, Jun. 2013, pp. 14-22.

Isam Ishaq et al., "IETF standardization in the field of the Internet of Things", J. Sens. Acuator Netw. 2, 2013, pp. 235-287.

Andrew Dillon et al., "User Acceptance of Information Technology: Theories and Models", In M. Williams (ed.) Annual Review of Information Science and Technology, vol. 31, Medford NJ: Information Today, 1996, 20 pages.

OECD, "Building Blocks for Smart Networks", OECD Digital Economy Papers, No. 215, OECD Publishing, Jan. 17, 2013, 30 pages.

Payam Barnaghi et al., "Semantics for the Internet of Things: early progress and back to the future", International Journal on Semantic Web and Information Systems vol. 8, 2012, 22 pages.

Wikipedia, "Internet of Things", http://en.wikipedia.org/wiki/Internet_of_Things, Dec. 30, 2013, 11 pages.

Heinrich Ruser, "Smart low-cost weather sensor as an example for 'multi-component' sensors", 2006 IEEE International Conference on Multisensor Fusion and Integration for Intelligent Systems, Sep. 3-6, 2006, pp. 559-564.

P. Hafliger, "Live demonstration; inductive power and telemetry for micro-implant", Proceedings of 2010 IEEE International Symposium on Circuits and Systems (ISCAS), 2010, p. 2775.

* cited by examiner

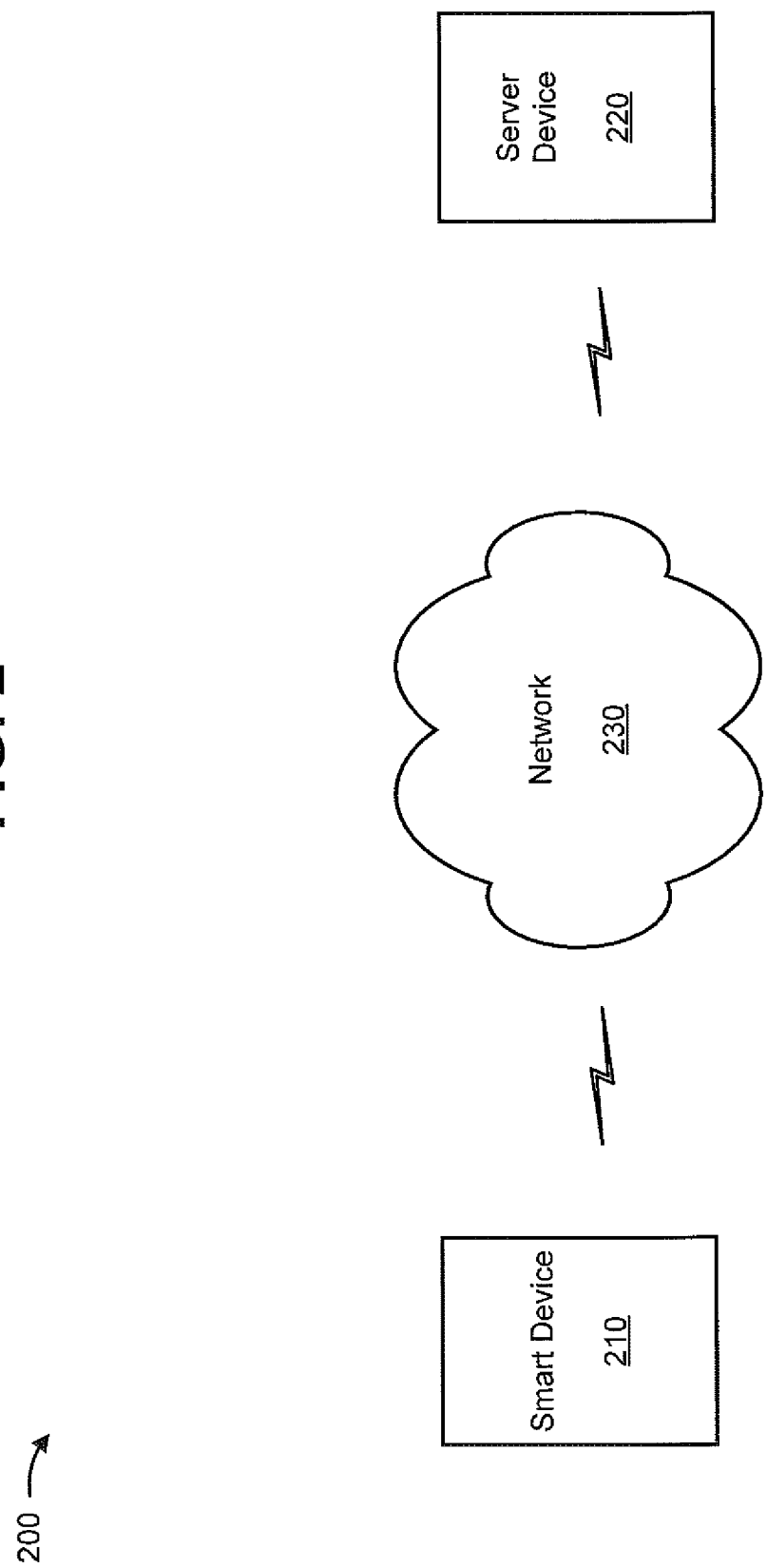

| Use Case Flag 530 | |
|---|---|
| Description Field | Value Field |
| M2M - Data exchanged between machines | U1 |
| M2H - Data sent from machines to humans | U2 |
| H2M - Data sent from humans to machines | U3 |
| H2H - Data exchanged between humans | U4 |

| Data Flow Flag 550 | |
|---|---|
| Data Flow Description Field | Data Flow Value Field |
| Out - Data being sent out | D1 |
| In - Data being received | D2 |
| Bidirectional - Data flow in both directions | D3 |
| Data Storage Description Field | Data Storage Value Field |
| None – No data storage | 0 |
| Unit – Data stored in smart device | 1 |
| Local – Data stored in local network | 2 |
| Remote – Data stored remotely | 3 |
| Time Period Description Field | Time Period Value Field |
| Time period | [0, 1, …n, n+1] |

540 →

Data Flow Entries
Data Storage Entries
Time Period Entry

FIG. 5D

| Economy and Lifecycle Flag 570 | |
|---|---|
| Service Description Field | Service Value Field |
| Date of service | E[ddmmyyyy] |
| Energy Description Field | Energy Value Field |
| Energy requirement | [0, 1, ...9] |
| Redundancy Description Field | Redundancy Value Field |
| Backup mechanisms | [0, 1] |
| Open Description Field | Open Value Field |
| For future use | [0, 1, ...65535] |

560

- Service Entry
- Energy Entry
- Redundancy Entry
- Open Entry

FIG. 5E

| Management and Control Flag 590 | |
|---|---|
| Description Field | Value Field |
| Independent - No control or management | M1 |
| Local - Infrequent or local control | M2 |
| Complex - Complex, or frequent control | M3 |

| Use case flag | Data flow flag | Economy and lifecycle flag | Management and control flag |
|---|---|---|---|
| U3 | D13n | E01052009610 | M3 |

| Use case flag | Data flow flag | Economy and lifecycle flag | Management and control flag |
|---|---|---|---|
| U1 | D100 | E15102008100 | M1 |

610

| Use case flag | Data flow flag | Economy and lifecycle flag | Management and control flag |
|---|---|---|---|
| U2 | D21n | E31052012200 | M2 |

LABEL FOR USE IN THE INTERNET OF THINGS

RELATED APPLICATION

This application claims priority to U.S. Provisional Patent Application No. 61/885,431, filed Oct. 1, 2013, the disclosure of which is incorporated by reference herein.

BACKGROUND

The Internet of Things (IoT) may be thought of as network of smart objects having identifiable virtual representations. Every smart object capable of communicating may be seen as part of the IoT. In the future, the IoT is expected to grow as smart objects become more common in everyday use. Accordingly, the IoT is expected to become more dynamic and more complex as more data is gathered from smart objects.

BRIEF DESCRIPTION OF THE DRAWINGS

FIG. 2 is a diagram of an example environment in which systems and/or methods described herein may be implemented;

FIG. 5C is a diagram of a data structure storing example values for a data flow flag included in the label and related to the example process shown in FIG. 4;

FIG. 5D is a diagram of a data structure storing example values for an economy and lifecycle flag included in the label and related to the example process shown in FIG. 4;

FIG. 5E is a diagram of a data structure storing example values for a management and control flag included in the label and related to the example process shown in FIG. 4;

FIGS. 6A and 6B are diagrams of example labels relating to the example process shown in FIG. 4;

DETAILED DESCRIPTION OF PREFERRED EMBODIMENTS

The following detailed description of example implementations refers to the accompanying drawings. The same reference numbers in different drawings may identify the same or similar elements.

Managing the IoT becomes more complex as the IoT grows and smart devices transmit data. For example, different hardware and software options and incompatible technological lifecycle time spans for smart devices may result in serious challenges for device orchestration, management, and network scaling. Implementations described herein provide a label including a universal, high-level labeling scheme that may facilitate managing the IoT.

Figure 1A:
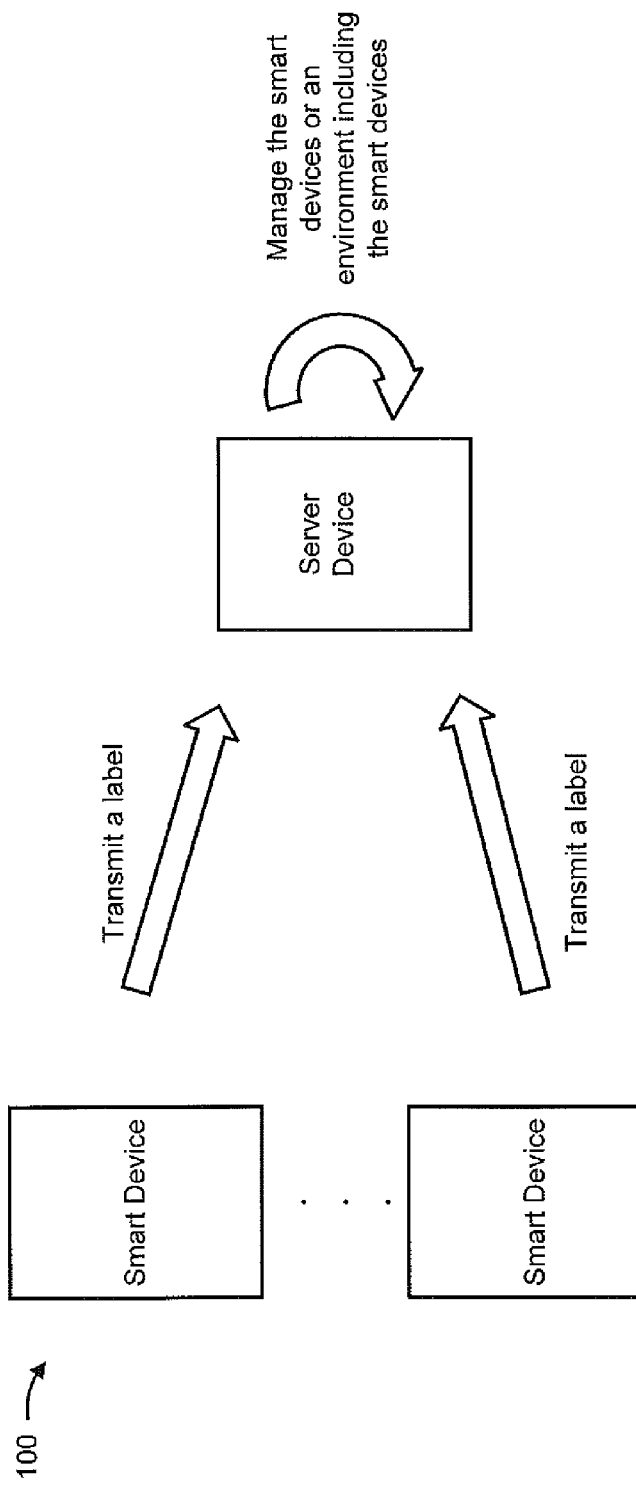
FIGS. 1A and 1B are diagrams of an overview of an example implementation described herein.
Figure 1B:
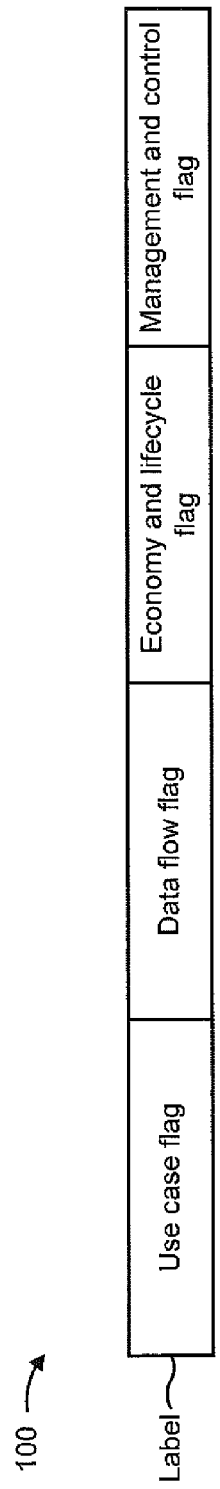

FIGS. 1A and 1B are diagrams of an overview of an example implementation 100 described herein. In example implementation 100, assume multiple smart devices each store a label including various flags.

As shown in FIG. 1A, the smart devices may transmit the labels to a server device (or another kind of device). The server device may receive the labels. Based on the labels, the server device may manage the smart devices and/or allocate resources within an environment. For example, server device may allocate local storage to store information for the smart devices, allocate bandwidth to be used by the smart devices, and/or provide power based on power requirements for the smart devices.

FIG. 1B illustrates an example of the label used in example implementation 100 having a universal labeling scheme including various flags. The label may include a use case flag, a data flow flag, an economy and lifecycle flag, and a management and control flag. The use case flag may indicate a kind of use for a smart device. The data flow flag may indicate a direction of data flow for a smart device. The economy and lifecycle flag may indicate service information for a smart device, energy information for a smart device, and/or redundancy mechanisms for a smart device. The management and control flag may indicate an administrative requirement for a smart device.

Accordingly, the server device may obtain information about different smart devices in an environment using the label (e.g., a universal label). Thus, the server device may manage multiple different kinds of smart devices and/or allocate resources in the environment based on the multiple different kinds of smart devices identified by the labels.

FIG. 2 is a diagram of an example environment 200 in which systems and/or methods described herein may be implemented. As shown in FIG. 2, environment 200 may include a smart device 210, a server device 220, and a network 230.

Smart device 210 may include a device capable of receiving and providing information, such as a label. For example, smart device 210 may include a mobile phone (e.g., a smart phone, a radiotelephone, a thermostat, an oven, etc.), a computing device (e.g., a desktop computer, a laptop computer, a tablet computer, a handheld computer, a camera, an audio recorder, a camcorder, etc.), an appliance (e.g., a refrigerator, a microwave, a stove, etc.), a medical device, a car, a light bulb, and/or a similar device. In some implementations, smart device 210 may include a communication interface that allows smart device 210 to receive information from and/or transmit information to server device 220 and/or another device in environment 200. Additionally, or alternatively, smart device 210 may be any device with a processor, a memory, and a communication device. A processor, a memory, and/or a communication device may be added to or included in any object to make the object a smart device 210. For example, a smart device 210 may be a shoe, a chair, a road, etc. In other words, smart device 210 may be any "thing" in the IoT.

Server device 220 may include one or more devices capable of processing and/or routing information. In some implementations, server device 220 may include a communication interface that allows server device 220 to receive information from and/or transmit information to other devices in environment 200.

Network 230 may include one or more wired and/or wireless networks. For example, network 240 may include a cellular network, a public land mobile network ("PLMN"), a second generation ("2G") network, a third generation ("3G") network, a fourth generation ("4G") network, a fifth generation ("5G") network, a long term evolution ("LTE") network, and/or a similar type of network. Additionally, or alternatively, network 270 may include a local area network ("LAN"), a wireless personal area network ("WPAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. Devices of environment 200 may interconnect via wired connections, wireless connections, or a combination of wired and wireless connections.

Figure 3:
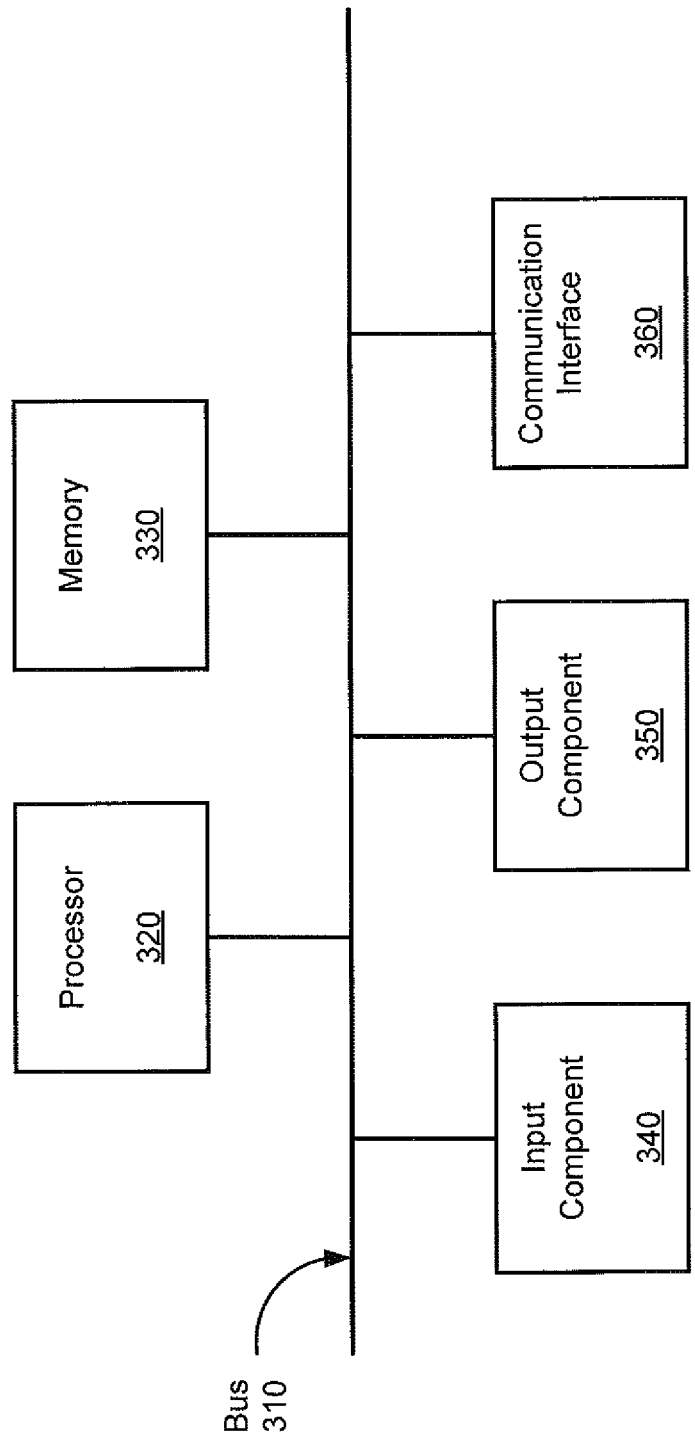
FIG. 3 is a diagram of example components of a device that corresponds to one or more devices of FIG. 2.

FIG. 3 is a diagram of example components of a device 300 that corresponds to one or more devices of FIG. 2. Device 300 may correspond to smart device 210 and/or server device 220. Additionally, or alternatively, smart device 210 and/or server device 220 may include one or more devices 300 and/or one or more components of device 300.

As illustrated in FIG. 3, device 300 may include a bus 310, a processor 320, a memory 330, an input component 340, an output component 350, and/or a communication interface 360.

Bus 310 may include a path that permits communication among the components of device 300. Processor 320 may include a processor (e.g., a central processing unit, a graphics processing unit, an accelerated processing unit), a microprocessor, and/or another type of processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). If device 300 corresponds to smart device 210, input component 340 may also include a sensor for sensing information. For example, input component 340 may include a sensor, such as a camera, a microphone, an accelerometer, a gyroscope, a GPS device, a magnetometer, a gravity sensor, a rotational sensor, a temperature/thermal sensor, a proximity sensor, a light sensor, a pressure sensor, a humidity sensor, an infrared sensor, a radio wave sensor, a dual lens camera, and/or another component that permits smart device 210 to receive input and/or detect conditions in the vicinity of smart device 210.

Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
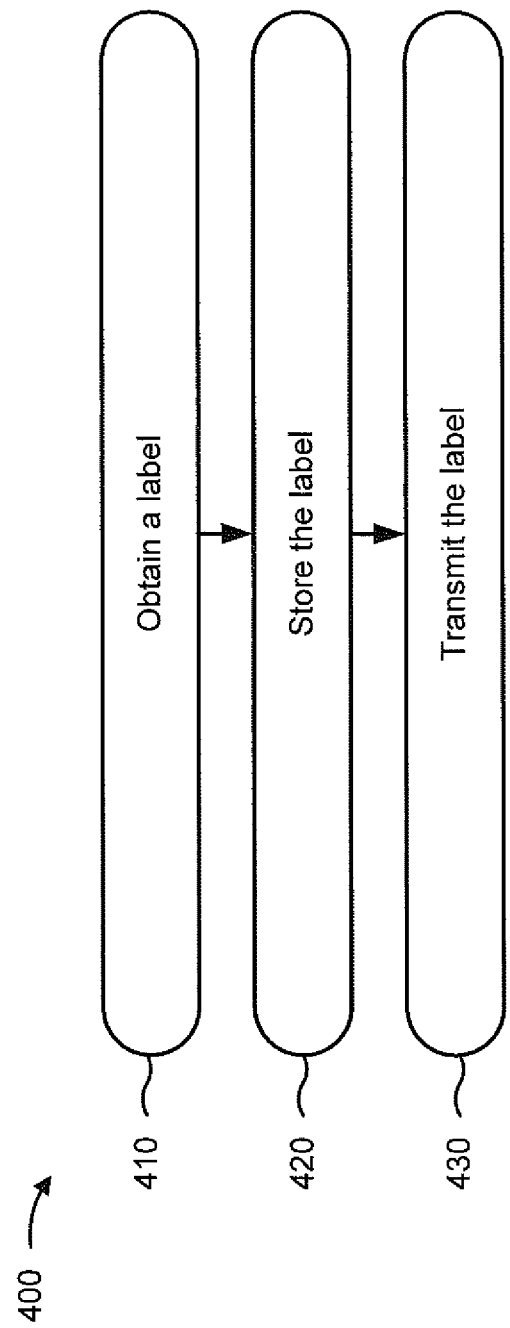
FIG. 4 is a flowchart of an example process for obtaining a label and transmitting the label.

FIG. 4 is a flowchart of an example process 400 for obtaining a label and transmitting the label. In some implementations, one or more process blocks of FIG. 4 may be performed by smart device 210. For example, smart device 210 may obtain a label, store the label, and transmit the label. Additionally, or alternatively, one or more process blocks of FIG. 4 may be performed by another device or a group of devices separate from or including smart device 210.

The label may be a bit sequence used to store binary values and may include a label header and/or different flags. For example, the label may include a use case flag, a data flow flag, an economy and lifecycle flag, and/or a management and control flag. In some implementations, the label may include other flags not disclosed herein. An example of a label is described in more detail with respect to FIGS. 5A-5E.

As shown in FIG. 4, process 400 may include obtaining the label (block 410). For example, smart device 210 may obtain the label. The label may be associated with smart device 210 and/or include information about smart device 210.

A label generating device may create the label and send the label to smart device 210. For example, a manufacturer of smart device 210 may create the label and transmit the label to smart device 210. Smart device 210 may then receive the label from the label generating device.

In some implementations, smart device 210 may generate the label. Accordingly, smart device 210 may obtain the label by generating the label. Additionally, or alternatively, the label may be programmed and/or input into smart device during and/or after manufacture of smart device 210.

Smart device 210 may obtain more than one label. For example, smart device 210 may have multiple functions. For instance, a smart phone may execute different applications or programs that serve different functions. Smart device 210 may obtain a label for each function and/or application. Additionally, or alternatively, smart device 210 may obtain a label that can be used for multiple functions and/or applications.

As further shown in FIG. 4, process 400 may include storing the label (block 420). For example, smart device 210 may store the label in a memory of smart device 210.

A label may be static and stored in a fixed manner that does not allow smart device 210 to change the label. Additionally, or alternatively, a label may be dynamic and stored in a manner allowing smart device 210 to change the label autonomously and/or based on a remote trigger (e.g., based on instructions received from server device 220). Smart device 210 may store more than one label. For example, smart device 210 may store labels for different functions and/or applications, and these labels may be static and/or dynamic.

In some implementations, smart device 210 may process the label. For example, the label may be configurable and smart device 210 may apply processing logic to the received label before storing the label. Additionally, or alternatively, the label may include information causing smart device 210 to execute processing. For example, the label may include information identifying sleep, wakeup, power on, and/or power off times. Accordingly, smart device 210 may enter an active mode, a standby mode, a power on mode, and/or a power off mode based on the label.

As further shown in FIG. 4, process 400 may include transmitting the label (block 430). For example, smart device 210 may transmit the label to server device 220 and/or another smart device 210.

In some implementations, smart device 210 may transmit the label once to register smart device 210 with server device 220 and/or another smart device 210. Additionally, or alternatively, smart device 210 may periodically transmit the label to maintain registration in a local network. For example, smart device 210 may be in a local network and may transmit the label to server device 220 in the local network once to register the smart device 210 in the local network. Smart device 210 may periodically transmit the label to maintain registration in the local network. In other words, server device 220 may be informed that smart device 210 is still in the local network and has not been removed from the local network.

In some implementations, smart device 210 may include the label in every data packet smart device 210 transmits. For example, smart device 210 may include the label in a header, a footer, and/or a payload of a data packet.

In some implementations, smart device 210 may transmit the label when server device 220 or another device requests the label and/or reads the label from smart device 210.

In some implementations, smart device 210 may transmit more than one label. For example, smart device 210 may transmit different labels for different functions and/or applications. Additionally, or alternatively, different labels may be transmitted at different times and/or at different frequencies.

While a series of blocks has been described with regard to FIG. 4, the blocks and/or the order of the blocks may be modified in some implementations. Additionally, or alternatively, non-dependent blocks may be performed in parallel.

Figure 5A:
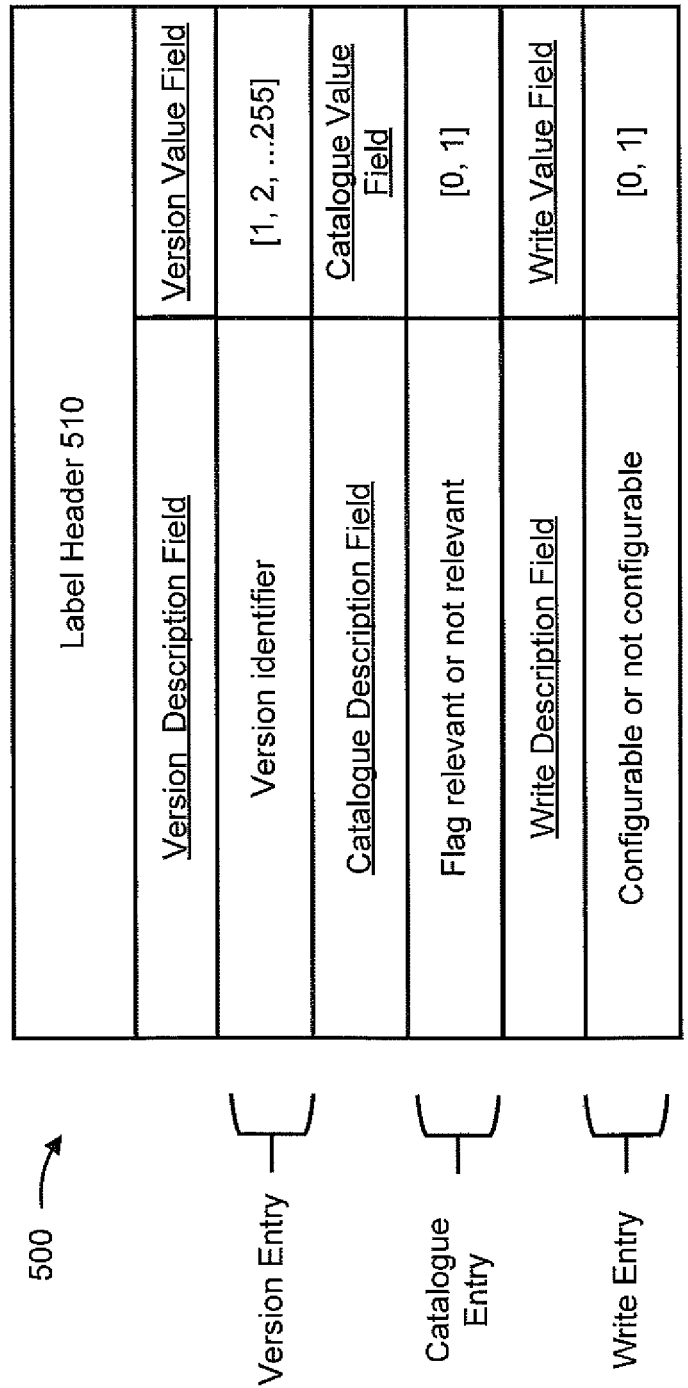
FIG. 5A is a diagram of a data structure storing example values for a label header included in the label and related to the example process shown in FIG. 4.

FIG. 5A is a diagram of a data structure 500 storing example values for a label header 510 included in a label and related to process 400 shown in FIG. 4. Smart device 210 and/or server device 220 may store data structure 500 in a memory.

Label header 510 may indicate administrative information associated with the label. For example, label header 510 may include a version value indicating a version of the label, a catalogue value indicating whether flags in the label include relevant information, and/or a write value indicating whether the label is configurable. In some implementations, label header 510 may include a catalogue value for each flag in the label. Data structure 500 may associate the version value, the catalogue value, and/or the write value with descriptions used to interpret label header 510.

Data structure 500 may include a version description field associated with a version value field, a catalogue description field associated with a catalogue value field, and/or a write description field associated with a write value field.

A version entry in data structure 500 may include a description in the version description field and a corresponding version value in the version value field. The description may indicate that the version value indicates a version of the label (e.g., a version name, a version number, etc.). In some implementations, each version value may correspond to a version of the label. Additionally, or alternatively, a predetermined version value (e.g., 255) may indicate the label should be ignored and/or not processed. As shown in FIG. 5A, the version value may have 255 different values (e.g., 1 to 255). In some implementations, the version value may have additional, fewer, or different values.

A catalogue entry in data structure 500 may include a description in the catalogue description field and a corresponding catalogue value in the catalogue value field. The description may indicate that a flag associated with the catalogue value is relevant or not relevant. For example, the catalogue value having a first value (e.g., 0) may indicate an associated flag (e.g., the use case flag, the data flow flag, the economy and lifecycle flag, and/or the management and control flag) may not be relevant and should be ignored. On the other hand, the catalogue value having a second value (e.g., 1) may indicate an associated flag (e.g., the use case flag, the data flow flag, the economy and lifecycle flag, and/or the management and control flag) may be relevant and should be used for processing. As shown in FIG. 5A, the catalogue value may have two different values (e.g., 0 and 1). In some implementations, the catalogue value may have additional, fewer, or different values.

Label header 510 may include more than one catalogue value. For example, label header 510 may include a catalogue value for each of the use case flag, the data flow flag, the economy and lifecycle flag, and/or the management and control flag. An order of the catalogue values in label header 510 may indicate which catalogue value corresponds to which flag. For example, a first catalogue value may correspond to the use case flag, a second catalogue value may correspond to the data flow flag, a third catalogue value may correspond to the economy and lifecycle flag, and/or a fourth catalogue value may correspond to the management and control flag. In some implementations, the order of the catalogue values may be different and correspond to different flags.

A write entry in data structure 500 may include a description in the write description field and a corresponding write value in the write value field. The description may indicate whether the label is configurable and/or whether the label is rewritable. For example, the write value having a first value (e.g., 0) may indicate that the label is not configurable and/or is not rewritable (e.g., fixed). On the other hand, the write value having a second value (e.g., 1) may indicate that the label is configurable and/or is rewritable (e.g., dynamic). As shown in FIG. 5A, the write value may have two different values (e.g., 0 and 1). In some implementations, the write value may have additional, fewer, or different values. For example, the write value may have a third value indicating the label is configurable and/or updatable autonomously. Additionally, or alternatively, the write value may have a fourth value indicating the label is configurable and/or updateable based on a remote trigger (e.g., based on instructions received from server device 220 and/or another remote device). It will be appreciated that these first, second, third, and fourth values are given as examples, and more than or fewer than the ones listed here may be used in the write value field of structure 500.

Label header 510 may include a version value (e.g., 1 to 255) that is represented by 8 bits. In some implementations, greater than or less than 8 bits may represent the version value. Label header 510 may include a catalogue value (e.g., 0 or 1) that is represented by one bit. In some implementations, greater than one bit may represent the catalogue value. Additionally, or alternatively, label header 510 may include multiple catalogue values. For example, label header 510 may include seven catalogue values represented by seven bits (e.g., a catalogue value for each of the use flag, the data flow flag, the economy lifecycle flag, and/or the management and control flag, and three bits for possible flags to be added). In some implementations, label header 510 may include greater than or less than seven catalogue values represented by greater than or less than seven bits. Label header 510 may include a write value (e.g., 0 or 1) that is represented by one bit. In some implementations, more than one bit may represent the write value. Accordingly, label header 510 may have a length of two bytes (e.g., 16 bits). In some implementations, label header 510 may have a length greater than or less than two bytes.

In some implementations, label header 510 may have a value (001-255)(0-1)(0-1)(0-1)(0-1)(0-1)(0-1)(0-1)(0-1), where the first value represents a version value, the second through fourth values represent catalogue values for possible flags, the fifth through eighth values represent catalogue values for the use flag, the data flow flag, the economy lifecycle flag, and the management and control flag, and the ninth value represents a write value. For example, a value of 14700011110 may indicate the label is set to version 147, all of the use flag, the data flow flag, the economy lifecycle flag, and the management and control flag are relevant, and the label is not configurable.

Label header 510 may be used by server device 220 and/or smart device 210 to implement various version control mechanisms based on the version of the label. Additionally, or alternatively, label header 510 may indicate to server device 220 and/or smart device 210 which flags are relevant and include information that may be used for processing. Furthermore, label header 510 may be used by server device 220 and/or smart device 210 to determine if the label is configurable.

While FIG. 5A shows data structure 500 as having a particular number and arrangement of fields, in practice data structure 500 may include fewer fields, additional fields, or different fields than are shown in FIG. 5A.

Figure 5B:
FIG. 5B is a diagram of a data structure storing example values for a use case flag included in the label and related to the example process shown in FIG. 4.

FIG. 5B is a diagram of a data structure 520 storing example values for a use case flag 530 included in a label and related to process 400 shown in FIG. 4. Smart device 210 and/or server device 220 may store data structure 520 in a memory.

Use case flag 530 may indicate system imminent behavior for use cases related to the kind of smart device 210. In other words, use case flag 530 may indicate a kind of transmitter from which smart device 210 receives data and/or a kind of receiver to which smart device 210 transmits data. In some implementations, use case flag 530 may indicate a kind of communication used by the device. Data structure 520 may associate a value for use case flag 530 with a description used to interpret use case flag 530.

Data structure 520 may include a description field and a value field associated with use case flag 530. The description field may include information indicating a description and/or a type of use case. The value field may include a value included in use case flag 530 that identifies the use case. The values provided in FIG. 5B are example values and the values may be any values that identify the use cases. An entry in data structure 520 may include a description in the description field and a corresponding value in the value field.

As shown in FIG. 5B, data structure 520 may include entries for four different types of use cases for smart device 210: machine-to-machine (M2M), machine-to-human (M2H), human-to-machine (H2M), and/or human-to-human (H2H). In some implementations, data structure 520 may include entries for other types of use cases.

An entry for the M2M use case may include a description, in the description field, indicating data is exchanged between machines and/or sent from a machine to a machine. In other words, a machine transmitter transmits data to a machine receiver. For example, a M2M use case may apply to a device on a car that sends data indicating driving behavior to an insurance company server and/or a navigation server. Use case flag 530 may have a first value, which identifies the M2M use case, in the value field (shown as value "U1" in FIG. 5B).

An entry for the M2H use case may include a description, in the description field, indicating data is sent from a machine to a human. In other words, a machine transmitter sends data to a human receiver. A human receiver may receive the data through an output component 350 of the machine (e.g., a LED, a display, a speaker, a haptic feedback device, etc.). For example, a M2H use case may apply to a display that is advertising content to a user or a speaker emitting a sound to a user. Use case flag 530 may have a second value, which identifies the M2H use case, in the value field (shown as value "U2" in FIG. 5B).

An entry for the H2M use case may include a description, in the description field, indicating data is sent from a human to a machine. In other words, a human transmitter sends data to a machine receiver. For example, a H2M use case may apply to a medical device that records medical information from a human (e.g., blood pressure, heart rate, etc.) Additionally, or alternatively, a H2M use case may apply to an input component 340 that a person uses to input information into a machine (e.g., a keyboard, a microphone, etc.). Use case flag 530 may have a third value, which identifies the H2M use case, in the value field (shown as value "U3" in FIG. 5B).

An entry for the H2H use case may include a description, in the description field, indicating data is sent from a human to a human and/or exchanged between humans. In other words, a human transmitter sends data to a human receiver. For example, a H2H use case may apply to a person sending a text message to another person. In some implementations, the H2H use case may involve machines that transmit and/or receive the data as long as a human inputs the data and a human receives the data. Use case flag 530 may have a fourth value, which identifies the H2H use case, in the value field (shown as value "U4" in FIG. 5B).

In some implementations, use case flag 530 may be represented by two bits assuming use case flag has four different possible values. However, use case flag 530 may have additional or fewer bits representing additional use cases, fewer use cases, and/or different use cases.

Use case flag 530 may improve social acceptance of the IoT by increasing transparency of devices. For example, people may be hesitant to accept potentially billions of objects in everyday life being smart objects with the ability to communicate information. However, use case flag 530 may be used by smart device 210 and/or server device 220 to present information to a user indicating a use case for smart device 210 and allow users to understand the use for smart device 210.

Accordingly, a label, stored by smart device 210, may include a value for use case flag 530 and smart device 210 may transmit the label. Server device 220 and/or another smart device 210 may receive the label including the value for use case flag 530 from smart device 210. Thus, server device 220 and/or another smart device 210 may determine a description and/or type of use case for smart device 210 based on the value for use case flag 530 from data structure 520.

While FIG. 5B shows data structure 520 as having a particular number and arrangement of fields, in practice data structure 520 may include fewer fields, additional fields, or different fields than are shown in FIG. 5B.

FIG. 5C is a diagram of a data structure 540 storing example values for a data flow flag 550 included in a label and related to process 400 shown in FIG. 4. Smart device 210 and/or server device 220 may store data structure 540 in a memory. The term "data," as used with regard to data flow flag 550, may refer to data which is usage related, in contrast to control or management data. Likewise, the term "data flow," or the like, may represent traffic of usage data.

Data flow flag 550 may include a data flow value indicating a direction of data flow, a data storage value indicating where data is stored, and/or a time period value indicating a time period data is stored. Data structure 540 may associate the data flow value, the data storage value, and/or the time period value of data flow flag 550 with descriptions used to interpret data flow flag 550.

Data structure 540 may include a data flow description field associated with a data flow value field, a data storage description field associated with a data storage value field, and/or a time period description field associated with a time period value field.

A data flow entry in data structure 540 may include a description in the data field description field and a corresponding data flow value in the data flow value field. As shown in FIG. 5C, data structure 540 may include data flow entries for three types of data flows for smart device 210: out, in, and bidirectional. However, data structure 540 may include data flow entries for other types of data flows.

A data flow entry for an out data flow may include a description, in the data flow description field, indicating data is transmitted by smart device 210 and no data is received via communication with another device. For example, a temperature sensor sending temperature data to server device 220 without receiving information back from server device 220 may store a label having a data flow flag with the data flow value indicating an out data flow. The data flow value in the data flow value field may have a first value for an out data flow (shown as value "D1" in FIG. 5C).

A data flow entry for an in data flow may include a description, in the data flow description field, indicating data is received by smart device 210 and no data is transmitted by smart device 210. For example, an in data flow may apply to a display that receives advertisements from server device 220 for displaying to a person, but that does not send data back to server device 220. The data flow value in the data flow value field may have a second value for an in data flow (shown as value "D2" in FIG. 5C).

A data flow entry for a bidirectional data flow may include a description, in the data flow description field, indicating data flows in both directions (i.e., data is received by smart device 210 and sent out by smart device 210). For example, a bidirectional data flow may apply to a navigation device that sends position data to a server and receives data indicating directions. The data flow value in the data flow value field may have a third value for a bidirectional data flow (shown as value "D3" in FIG. 5C).

A data storage entry in data structure 540 may include a description in the data storage description field and a data storage value in the data flow value field. As shown in FIG. 5C, data structure 540 may include data storage entries for four types of data storage for smart device 210: no data storage, unit data storage, local data storage, and/or remote data storage. However, data structure 540 may include data storage entries for other types of data storage.

A data storage entry for no data storage may include a description, in the data storage description field, indicating no data is stored. The data storage value in the data storage value field may have a first value for no data storage (shown as value "0" in FIG. 5C).

A data storage entry for unit data storage may include a description, in the data storage description field, indicating data is stored in a memory of smart device 210. The data storage value in the data storage value field may have a second value for unit data storage (shown as value "1" in FIG. 5C).

A data storage entry for local data storage may include a description, in the data storage description field, indicating data is stored in a local network of smart device 210. The data storage value in the data storage value field may have a third value for local data storage (shown as value "2" in FIG. 5C).

A data storage entry for remote data storage may include a description, in the data storage description field, indicating data is stored remotely relative to smart device 210. The data storage value in the data storage value field may have a fourth value for remote data storage (shown as value "3" in FIG. 5C).

A time period entry in data structure 540 may include a description in the time period description field and a corresponding time period value in the time period value field.

A time period entry may include a description, in the time period description field, indicating a unit of time and/or a time period to store the data. For example, the time period description field may indicate a number of seconds, minutes, hours, days, weeks, months, and/or years to store the data. The time period value in the time period value field may indicate a number of time units (e.g., hours) to store the data. The time period value may be a value from 0 to n+1, where n indicates a maximum specified time period the data can be stored and n+1 indicates storing the data for an unlimited time. For example, the time period value may indicate a number of hours and n may be equal to 17520 (e.g., the equivalent of 2 years). Accordingly, a time period value of 17521 (i.e., n+1) may indicate storing the data for an unlimited time.

Data flow flag 550 may include a data flow value (e.g., D1, D2, or D3) that is represented by two bits. In some implementations, greater than or less than two bits may represent the data flow value. Data flow flag 550 may include a data storage value (e.g., 0, 1, 2, or 3) that is represented by two bits. In some implementations, greater than or less than two bits may represent the data storage value. Data flow flag 550 may include a time period value (e.g., 0 to n+1) that is represented by a number of bits depending on the value of n. For example, assuming n is equal to 17520 as previously discussed, the data flow value may be presented by 15 bits. In some implementations, greater than or less than 15 bits may represent the time period value.

In some implementations, data flow flag 550 may have a value D(1-3)(0-3)(0-n+1). For example, data flow flag 550 having a value D12n may represent a smart device 210 that sends data out with a requirement for local storage (on a server/gateway) for a time period n.

Data flow flag 550 may improve social acceptance of the IoT by increasing transparency of devices. For example, a user may be unsure what smart devices 210 around the user are transmitting data. However, data flow flag 550 may indicate to a user what kinds of data flows are used by an object and this may ease any privacy concerns a user has about the IoT. Additionally, or alternatively, data flow flag may allow for improved management of bandwidth allocation. For example, server device 220 may manage bandwidth allocation for a number of smart devices 210. Data flow flag 550 may allow server device 220 to know how many smart devices 210 and which smart devices 210 need bandwidth to send or transmit data and allocate bandwidth accordingly. In some implementations, a local gateway may allocate dynamic bandwidth requirements over a fixed wide area network (WAN) or mobile network based on data flow flag 550. Furthermore, data flow flag may 550 may provide insight in data storage requirements for a wireless private area network (WPAN) and could allocate resources dynamically.

Accordingly, a label, stored by smart device 210, may include a value for data flow flag 550 and smart device 210 may transmit the label. Server device 220 and/or another smart device 210 may receive the label including the value for data flow flag 550 from smart device 210. Thus, server device 220 and/or another smart device 210 may determine a kind of data flow, where data is stored, and/or a time period data is stored for smart device 210 based on the value/s for data flow flag 550 from data structure 540.

While FIG. 5C shows data structure 540 as having a particular number and arrangement of fields, in practice data structure 540 may include fewer fields, additional fields, or different fields than are shown in FIG. 5C.

FIG. 5D is a diagram of a data structure 560 storing example values for an economy and lifecycle flag 570 included in the label and related to process 400 shown in FIG. 4. Smart device 210 and/or server device 220 may store data structure 560 in a memory.

Economy and lifecycle flag 570 may include a service value indicating service information for smart device 210, an energy value indicating energy information for smart device 210, a redundancy value indicating redundancy mechanisms for smart device 210, and/or an open value left open for future use. Data structure 560 may associate the service value, the energy value, the redundancy value, and/or the open value with descriptions used to interpret economy and lifecycle flag 570.

Data structure 560 may include a service description field associated with a service value field, an energy description field associated with an energy value field, a redundancy description field associated with a redundancy value field, and/or an open description field associated with an open value field.

A service entry in data structure 560 may include a description in the service description field and a corresponding service value in the service value field. The description may indicate that the service value indicates a date of service. The date of service may indicate a date of production, a date of deployment, a date of activation, an uptime since a last restart, a date smart device 210 was last updated or serviced, etc. The service value field may include a eight digit value DDMMYYYY, where DD has a value from 01 to 31 indicating a day of service, where MM has a value from 01 to 12 indicating a month of service, and where YYYY has a value from 0000 to 9999 indicating a year of service. The service value may include greater or less than eight digits to indicate more specific dates or less specific dates.

An energy entry in data structure 560 may include a description in the energy description field and a corresponding energy value in the energy value field. The description may indicate that the energy value indicates an energy requirement for smart device 210. The energy value in energy value field may indicate an amount of energy or a range of energy used by smart device 210 during a certain time period (e.g., per week, per month, per year, etc.). For instance, a first value (e.g., 0) may indicate that smart device 210 uses between 0 kilowatt hours (kWh) and 1 kWh. A second value (e.g., 1) may indicate that smart device 210 uses between 1 kWh and ten kWh. Accordingly, a range of energy use may be set for each energy value. As shown in FIG. 5D, the energy value may have ten different values (e.g., 0 to 9). In some implementations, the energy value may have additional, fewer, or different values.

A redundancy entry in data structure 560 may include a description in the redundancy description field and a corresponding redundancy value in the redundancy value field. The description may indicate that the redundancy value indicates a kind of redundancy mechanism for smart device 210 and/or whether a redundancy mechanism exists. For example, the redundancy value may have a first value (e.g., 0) indicating that redundancy mechanisms do not exist for smart device 210. On the other hand, the redundancy value may have a second value (e.g., 1) indicating redundancy mechanisms exist for smart device 210. In some implementations, a redundancy mechanism may indicate downstream redundancy requirements. For example, a description associated with a redundancy value may indicate that data sent from smart device 210 needs to be stored in more than one location. Additionally, or alternatively, a description associated with a redundancy value may indicate built-in redundancy capabilities. For example, a redundancy value may indicate that smart device 210 may receive information that is required to be stored in more than one device.

An open entry in data structure 560 may include a description in the open description field and a corresponding open value in the open value field. The open value in economy and lifecycle flag 570 may be a space left open for future use. If the label is dynamic and may be changed or updated, an open value may be included in economy and lifecycle flag 570 indicating a new kind of data. For example, the description in the open description field may indicate the new kind of data is security data indicating security requirements for smart device 210. Additionally, or alternatively, the description in the open description field may indicate the new kind of data indicates a sleep time and/or wake-up time that allows smart device 210 and/or server device 220 to trigger a sleep state and/or an active state. For example, if the label is configurable, the open description field may indicate a date a device will switch off, go into standby, and/or reactivate. On the other hand, the label may be fixed. In such a case, the open value may always be empty or include a fixed value that may not change.

Economy and lifecycle flag 570 may include a service value (e.g., E(DDMMYYYY)) that is represented by 21 bits. In some implementations, greater than or less than 21 bits may represent the service value. Economy and lifecycle flag 570 may include an energy value (e.g., 0 to 9) that is represented by four bits. In some implementations, greater than or less than four bits may represent the energy value. Economy and lifecycle flag 570 may include a redundancy value (e.g., 0 or 1) that is represented by one bit. In some implementations, greater than one bit may represent the redundancy value. Economy and lifecycle flag 570 may include an open value. For example, the open value may be represented by 16 bits. In some implementations, greater than or less than 16 bits may represent the open value.

In some implementations, economy and lifecycle flag 570 may have a value E(DDMMYYYY)(0-9)(0-1)(n), where n is any value. For example, E11032007010 may represent a smart device 210 produced in Mar. 11, 2007, having a low level energy requirement, and having a redundancy mechanism.

Economy and lifecycle flag 570 may be used to improve management of devices and/or allocation of resources. For example, maintenance for devices may be scheduled for machines in a factory based on the machines' production or service dates. Additionally, or alternatively, energy requirements of smart devices 210 may be centrally collected, processed, and used to enable development of lean energy management applications, provide energy on demand, and/or purchase energy based on real-time requirements (e.g., an energy brokerage).

Accordingly, a label, stored by smart device 210, may include a service value, an energy value, a redundancy value, and/or an open value for economy and lifecycle flag 570. Smart device 210 may transmit the label and server device 220 and/or another smart device 210 may receive the label including the value/s for economy and lifecycle flag 570 from smart device 210. Thus, server device 220 and/or another smart device 210 may determine service information, energy information, redundancy information, and/or other information for smart device 210 based on the value/s for economy and lifecycle flag 570 from data structure 560.

While FIG. 5D shows data structure 560 as having a particular number and arrangement of fields, in practice data structure 560 may include fewer fields, additional fields, or different fields than are shown in FIG. 5D.

FIG. 5E is a diagram of a data structure 580 storing example values for a management and control flag 590 included in the label and related to process 400 shown in FIG. 4. Smart device 210 and/or server device 220 may store data structure 580 in a memory.

Management and control flag 590 may indicate an administrative requirement for smart device 210.

Data structure 580 may include a description field and a value field associated with management and control flag 590. The description field may include information indicating an administrative requirement. The value field may include a value included in management and control flag 590 that identifies the administrative requirement. The values provided in FIG. 5E are example values and the values may be any values that identify the administrative requirements. An entry in data structure 580 may include a description in the description field and a corresponding value in the value field.

As shown in FIG. 5E, data structure 580 may include entries for three different types of administrative requirements for smart device 210: independent, local, and complex.

An entry for an independent administrative requirement may include a description, in the description field, indicating smart device 210 does not require management from an external device. For example, once deployed, certain devices (e.g., a temperature sensor) may not need further control or software updates. Management and control flag 590 may have a first value for an independent administrative requirement case in the value field (shown as "M1" in FIG. 5E).

An entry for a local administrative requirement may include a description, in the description field, identifying a case where smart device 210 requires some basic and/or low level management which may be fulfilled by a local gateway or server. For example, a display displaying an advertisement may require software updates that can be provided by a local gateway. Management and control flag 590 may have a second value for a local administrative requirement case in the value field (shown as "M2" in FIG. 5E).

An entry for a complex administrative requirement may include a description, in the description field, indicating a case where smart device 210 requires complex and/or frequent management that requires remote assistance. For example, a navigation system on a phone may require frequent software upgrades and processing by remote servers. Management and control flag 590 may have a third value for a complex administrative requirement case in the value field (shown as "M3" in FIG. 5E).

Accordingly, management and control flag 590 may be represented by two bits assuming management and control flag 590 has three different values. However, management and control flag 590 may have a different number of bits representing additional types of administrative requirements, fewer administrative requirements, and/or different administrative requirements. For example, control flag 590 may include a bit indicating whether smart device 210 supports a timer functionality used for switching off, switching on, and/or going into a standby state as indicated by an open value in economy and lifecycle flag 570.

Management and control flag 590 may be used to improve management of devices and/or allocation of resources. For example, a local network gateway may execute the basic or low level management while handing off the more complex management requirements to a central management station on behalf of the environment managed by the local network gateway.

Accordingly, a label, stored by smart device 210, may include a value for management and control flag 590 and smart device 210 may transmit the label. Server device 220 and/or another smart device 210 may receive the label including the value for management and control flag 590 from smart device 210. Thus, server device 220 and/or another smart device 210 may determine an administrative requirement for smart device 210 based on the value for management and control flag 590 and data structure 580.

While FIG. 5E shows data structure 580 as having a particular number and arrangement of fields, in practice data structure 580 may include fewer fields, additional fields, or different fields than are shown in FIG. 5E.

A label including use case flag 530, data flow flag 550, economy and lifecycle flag 570, and/or management and control flag 590 may gear environments towards more self-autonomy by reducing the overhead and management demand to areas of necessity. Moreover, the label may include information about use cases, data flow, service dates, energy requirements, backup functionality, and/or management requirements in as little as nine bytes. However, the length of the label may be shorter or longer than nine bytes. For example, if the label includes a label header, the label may include another two bytes. Thus, the label may be eleven bytes. Additionally, or alternatively, the label including the label header may be shorter or longer than eleven bytes. The label may also increase the transparency of functions for smart devices 210, which may result in increased social acceptance of the IoT.

The label may have a specific data format that distinguishes between the flags and/or label header 510. For instance, the sequence and number of bits may indicate where label header 510 and/or the flags start and stop. For example, label header may a first number of bits (e.g., 16 bits), use case flag 530 may be a subsequent number of bits (e.g., the first two bits), data flow flag 550 may be a next subsequent number of bits (e.g., 19 bits), economy and lifecycle flag 570 may be a next subsequent number of bits (e.g., 35 bits), and management and control flag 590 may be a next subsequent number of bits (e.g., two bits).

FIG. 6A is a diagram of an example label 600 relating to process 400 shown in FIG. 4. Example label 600 may have an alphanumeric label representation "U3D13nE01052009610M3." A value of the use case flag (i.e., U3) may indicate a human-to-machine smart device, such as a medical device measuring medical data from patients. A value of the data flow flag (i.e., D13n) may indicate the smart device transmits collected data to a remote device and indicate that the data should be stored for a time period n. A value of the economy and lifecycle flag (i.e., E01052009610) may indicate the smart device was manufactured in May 1, 2009, belongs to energy category 6, and requires backup mechanisms. A value of the management and control flag (i.e., M3) may indicate that the smart device requires frequent management.

FIG. 6B is a diagram of an example label 610 relating to process 400 shown in FIG. 4. Example label 610 may have an alphanumeric label representation "U1D100E15105302008100M1." A value of the use case flag (i.e., U1) may indicate a machine-to-machine smart device, such as an array of sensors which transmit certain signals based on weather conditions. For example, the signals may be used to turn on heat, air conditioning, water, or the like. A value of the data flow flag (i.e., D100) may indicate the smart device may sends out data, but the data does not need to be stored. A value of the economy and lifecycle flag (i.e., E15102008100) may indicate the smart device was manufactured in Oct. 15, 2008 and has low power requirements (e.g., category 1). A value of the management and control flag (i.e., M1) may indicate no control or maintenance is required once the array is deployed in an environment.

Figure 7:
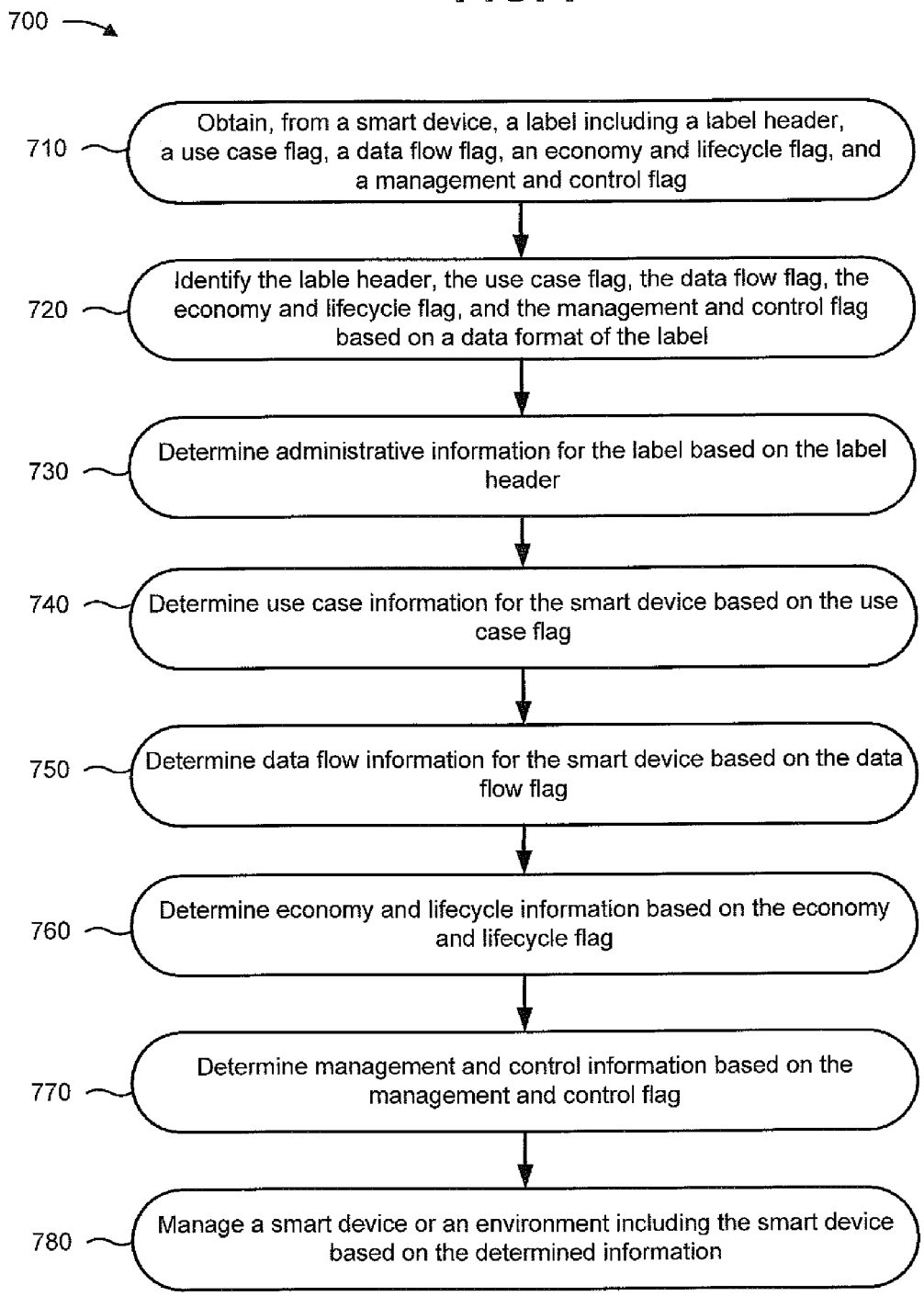
FIG. 7 is a flowchart of an example process for managing a smart device or an environment based on the label.

FIG. 7 is a flowchart of an example process 700 for managing smart device 210 or an environment based on a label. In some implementations, one or more process blocks of FIG. 7 may be performed by smart device 210 and/or server device 220. Additionally, or alternatively, one or more process blocks of FIG. 7 may be performed by another device or a group of devices separate from or including smart device 210 and/or server device 220.

As shown in FIG. 7, process 700 may include obtaining, from smart device 210, a label including label header 510, use case flag 530, data flow flag 550, economy and lifecycle flag 570, and management and control flag 590 (block 710). For example, server device 220 and/or another smart device 210 may obtain the label.

In some implementations, smart device 210 may transmit the label to server device 220 and/or another smart device 210. Server device 220 and/or the other smart device 210 may receive the label. In some implementations, server device 220 and/or the other smart device 210 may receive the label transmitted at block 430 in FIG. 4.

As further shown in FIG. 7, process 700 may include identifying label header 510, use case flag 530, data flow flag 550, economy and lifecycle flag 570, and management and control flag 590 based on a data format of the label (block 720).

The label may have a specific data format that distinguishes between the flags. For instance, a sequence and a number of bits may indicate where flags start and stop. Server device 220 and/or the other smart device 210 may store data format information that identifies the data format used to interpret the label. For example, the format information may indicate the sequence and the number of bits that represent each of the flags. The format information may also indicate what values for each flag indicate. For example, the format information may include data structure 500, data structure 520, data structure 540, data structure 560, and/or data structure 580.

In some implementations, server device 220 and/or the other smart device 210 may identify label header 510 as a first number of bits (e.g., 16 bits), use case flag 530 as a subsequent number of bits (e.g., the first two bits) in the label, identify data flow flag 550 as a next subsequent number of bits (e.g., 19 bits) in the label, identify economy and lifecycle flag 570 as a next subsequent number of bits (e.g., 35 bits) in the label, and identify management and control flag 590 as a next subsequent number of bits (e.g., two bits) in the label. In some implementations, the data format may have a different order of the flags and/or different numbers of bits for the flags.

As further shown in FIG. 7, process 700 may include determining administrative information for the label based on label header 510 (block 730). For example, server device 220 and/or another smart device 210 may determine the administrative information.

The administrative information may include information identifying a version of the label. For example, label header 510 may include a version value indicating a version of the label. Accordingly, server device 220 and/or the other smart device 210 may determine a version of the label based on the version value.

The administrative information may include information indicating whether the flags in the label include relevant information. For example, label header 510 may include one or more catalogue values indicating whether the flags include relevant information. If the catalogue value includes a first catalogue value (e.g., 0), server device 220 and/or the other smart device 210 may determine that a flag associated with the catalogue value does not include relevant information. If the catalogue includes a second catalogue value (e.g., 1), server device 220 and/or the other smart device 210 may determine that a flag associated with the catalogue value includes relevant information.

The administrative information may include information indicating whether the label is configurable. For example, label header 510 may include a write value indicating whether the label is configurable. If the write value includes a first write value (e.g., 0), server device 220 and/or the other smart device 210 may determine that the label is not configurable. If the write value includes a second write value (e.g., 1), server device 220 and/or the other smart device 210 may determine that the label is configurable.

As further shown in FIG. 7, process 700 may include determining use case information for smart device 210 based on use case flag 530 (block 740). For example, server device 220 and/or another smart device 210 may determine the use case information.

The use case information may indicate a use case for smart device 210. For example, if use case flag 530 includes a first value (e.g., U1), server device 220 and/or the other smart device 210 may determine a M2M use case. If use case flag 530 includes a second value (e.g., U2), server device 220 and/or the other smart device 210 may determine a M2H use case. If use case flag 530 includes a third value (e.g., U3), server device 220 and/or the other smart device 210 may determine a H2M use case. If use case flag 530 includes a fourth value (e.g., U4), server device 220 and/or the other smart device 210 may determine an H2H use.

As further shown in FIG. 7, process 700 may include determining data flow information for smart device 210 based on data flow flag 550 (block 750). For example, server device 220 and/or another smart device 210 may determine the data flow information.

The data flow information may indicate a direction of data flow for smart device 210. For example, if data flow flag 550 includes a first data flow value (e.g., D1), server device 220 and/or the other smart device 210 may determine an out data flow. If data flow flag 550 includes a second data flow value (e.g., D2), server device 220 and/or the other smart device 210 may determine an in data flow. If data flow flag 550 includes a fourth data flow value (e.g., D3), server device 220 and/or the other smart device 210 may determine a bidirectional data flow.

In some implementations, data flow flag 550 may include a data storage value indicating where data is stored. For example, if data flow flag includes a first data storage value (e.g., 0), server device 220 and/or the other smart device 210 may determine that no data is stored. If data flow flag 550 includes a second data storage value (e.g., 1), server device 220 and/or the other smart device 210 may determine that data is stored in a memory of smart device 210. If data flow flag 550 includes a third data storage value (e.g., 2), server device 220 and/or the other smart device 210 may determine that data is stored locally in a memory of a local network and/or server. If data flow flag 550 includes a fourth data storage value (e.g., 3), server device 220 and/or the other smart device 210 may determine that data is stored remotely outside of a local network.

In some implementations, data flow flag 550 may include a time period value indicating a time period the data is stored. Accordingly, server device 220 and/or the other smart device 210 may determine a time period the data is stored based on the time period value.

As further shown in FIG. 7, process 700 may include determining economy and lifecycle information for smart device 210 based on economy and lifecycle flag 570 (block 760). For example, server device 220 and/or another smart device 210 may determine the economy and lifecycle information.

In some implementations, economy and lifecycle flag 570 may include a service value indicating service information for smart device 210. For example, the service value may indicate a date of service of smart device 210. Accordingly, server device 220 and/or the other smart device 210 may determine a date that smart device 210 was produced or manufactured based on the service value.

In some implementations, economy and lifecycle flag 570 may include an energy value indicating energy information for smart device 210. For example, the energy value may indicate an amount of energy used by smart device 210. Accordingly, server device 220 and/or the other smart device 210 may determine an amount of energy used by smart device 210 based on the energy value.

In some implementations, economy and lifecycle flag may include a redundancy value indicating redundancy mechanisms for smart device 210. For example, the redundancy value may have a first value (e.g., 0) indicating that redundancy mechanisms do not exist for smart device 210. Accordingly, server device 220 and/or smart device 210 may determine redundancy mechanisms do not exist for smart device 210 based on the redundancy value having the first value. On the other hand, redundancy value may have a second value (e.g., 1) indicating redundancy mechanisms exist for smart device 210. Accordingly, server device 220 and/or smart device 210 may determine redundancy mechanisms exist for smart device 210 based on the redundancy value having the second value.

In some implementations, economy and lifecycle flag 570 may include an open value that is left open for future use. For example, the open value may be used to provide security data indicating security requirements for smart device 210. Accordingly, server device 220 and/or the other smart device 210 may determine information for future use based on the open value.

As further shown in FIG. 7, process 700 may include management and control information for smart device 210 based on management and control flag 590 (block 770). For example, server device 220 and/or another smart device 210 may determine the management and control information.

The management and control information may indicate an administrative requirement for smart device 210. For example, if management and control flag 590 includes a first value (e.g., M1), server device 220 and/or the other smart device 210 may determine smart device 210 does not require management from an external device. If management and control flag 590 includes a second value (e.g., M2), server device 220 and/or the other smart device 210 may determine smart device 210 requires basic and/or low level management by an external device. If management and control flag 590 includes a third value (e.g., M3), server device 220 and/or the other smart device 210 may determine smart device 210 requires complex or frequent management from an external device.

As further shown in FIG. 7, process 700 may include managing smart device 210 and/or an environment including smart device 210 based on information determined at block 730, block 740, block 750, block 760, and/or block 770 (block 780). For example, server device 220 and/or another smart device 210 may manage smart device 210 and/or an environment including smart device 210 based on the administrative information, the use case information, the data flow information, the economy and lifecycle information, and/or the management and control information.

In some implementations, server device 220 and/or the other smart device 210 may manage smart device 210 by updating the label based on the administrative information indicating that the label is configurable. For example, server device 220 and/or the other smart device 210 may update the label by sending update information to smart device 210. Smart device 210 may receive the update information and update the label. In some implementations, server device 220 and/or the other smart device 210 may update a version of the label. Server device 220 and/or the other smart device 210 may update a service provided to smart device 210 and/or remove smart device 210 from service in the environment based on a version of the label being out of date or expired. In some implementations, server device 220 and/or the other smart device 210 may update the open value field in the label to include security requirements and/or power requirements (e.g., sleep time, active time, power on time, power off time, etc.)

In some implementations, server device 220 and/or the other smart device 210 may manage the environment by displaying or providing a person with use case information indicating a use case for smart device 210 that allows the person to understand the use for smart device 210.

In some implementations, the data flow information may be used to manage bandwidth allocation. For example, server device 220 may manage bandwidth allocation for a number of smart devices 210. Server device 220 may determine data flow information for multiple smart devices 210 in an environment and determine which smart devices 210 need bandwidth to send or transmit data and allocate bandwidth accordingly. In some implementations, smart devices 210 may have constraints based on size (e.g., only so much room for memory or battery). Bandwidth within a network including a smart device 210 having constraints based on size may be a concern and an optimized traffic path may be a requirement to save bandwidth. Dynamic bandwidth allocation (e.g., grant bandwidth where and if the bandwidth is needed) could optimize use of resources and tailor use of resources to the needs of smart device 210.

In some implementations, a local gateway may allocate dynamic bandwidth requirements over a WAN or mobile network based on the data flow information. Furthermore, the data flow information may provide insight on data storage requirements for a WPAN and could allocate resources dynamically. For example, assume hundreds of smart devices 210 send data individually to remote stations in a cloud data center (e.g., as identified by the data storage value in the data flow flag). There may not always be a need for all the data to be sent to the remote stations as soon as the data is sent from the smart devices 210. Rather, data sent out from smart devices 210 may be collected locally, stored locally, and sent out to the cloud data center in batches. That way the wide area bandwidth requirements can be minimized and adjusted dynamically.

In some implementations, the economy and lifecycle information may be used to improve management of devices and/or allocation of resources. For example, maintenance for devices may be scheduled for machines in a factory based on the machines' service dates. Additionally, or alternatively, server device 220 and/or the other smart device 210 may determine that smart device 210 should be replaced based on the economy and lifecycle information (e.g., if a manufacture date satisfies a certain threshold).

Additionally, or alternatively, energy requirements for multiple smart devices 210 in the environment may be collected, processed, and used to enable development of lean energy management applications, provide energy on demand, and/or purchase energy based on real-time requirements (e.g., an energy brokerage). For example, the energy value in the economy and lifecycle flag may indicate energy requirements. Assuming environments have power constraints, a power management system can be developed which dynamically provides power based on real needs of smart devices 210 in the environment.

The management and control information may be used to improve management of devices and/or allocation of resources. For example, server device 220 may execute the basic or low level management while handing off the more complex management requirements to a central management station on behalf of the environment managed by server device 220. The management and control information may also indicate whether smart device 210 requires software updates that need to be provided by server device 220.

While a series of blocks has been described with regard to FIG. 7, the blocks and/or the order of the blocks may be modified in some implementations. Additionally, or alternatively, non-dependent blocks may be performed in parallel.

Figures 8A, 8B:
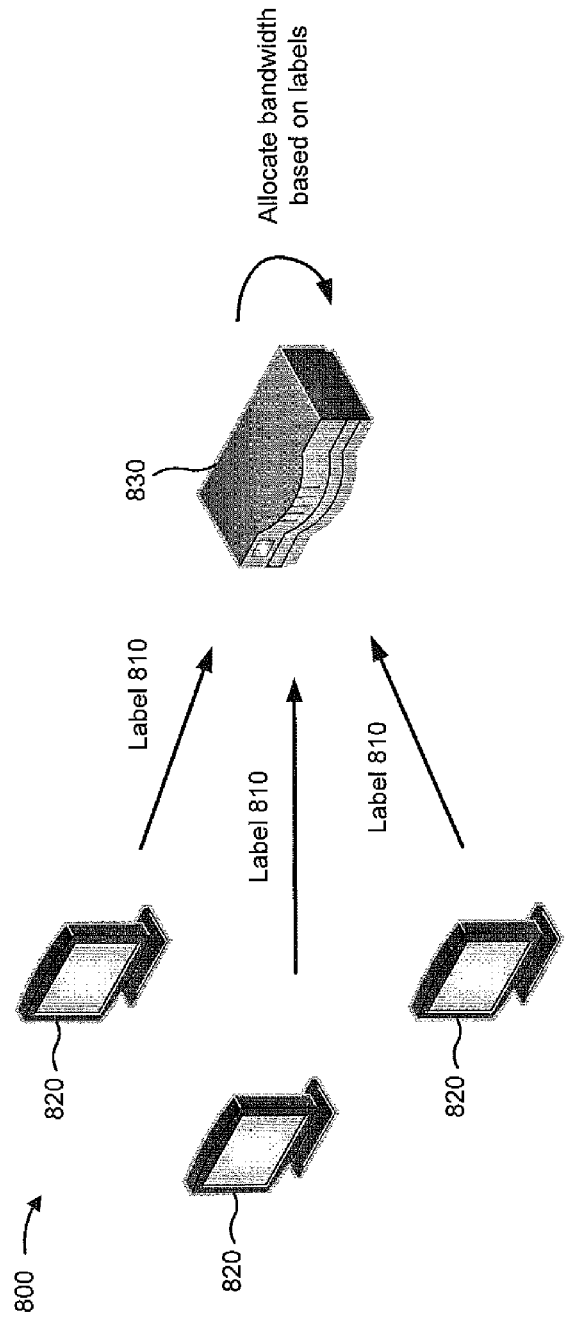
FIGS. 8A and 8B are diagrams of an example implementation relating to the example process shown in FIG. 7.

FIGS. 8A and 8B are diagrams of an example implementation 800 relating to process 700 shown in FIG. 7.

FIG. 8A illustrates a label 810. Assume label 810 has an alphanumeric label representation "U2D21nE31052012200M2." Label 810 may represent a M2H display device that advertises content to a person based on certain user activity or remote triggering. The display device may download data from the Internet and store the data for a time n (e.g., for the advertisement to be replayed). The display device may have been manufactured in May 31, 2012 and belong to an energy category 2. The display may require infrequent software updates that are provided by a local server that manages multiple displays.

FIG. 8B illustrates multiple display devices 820 that store label 810. For example, display devices 820 may be advertising display devices in a shopping center. Display devices 820 transmit the label to a router 830. Router 830 identifies a value for data flow flag (e.g., D21n) based on the data format of the label and recognizes that there are multiple display devices 820 (e.g., three as shown in FIG. 8B) in the environment that have an in data flow. Router 830 may calculate a best downlink path for display devices 820 and allocate the bandwidth dynamically. Additionally, or alternatively, router 830 may determine that display devices 820 require little or no uplink paths (e.g., display devices 820 do not upload data). Accordingly, router 820 may use bandwidth in an outward direction for other purposes.

Implementations described herein provide a label including a universal, high-level labeling scheme that may facilitate managing an IoT.

The foregoing disclosure provides illustration and description, but is not intended to be exhaustive or to limit the implementations to the precise form disclosed. Modifications and variations are possible in light of the above disclosure or may be acquired from practice of the implementations.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

As used herein, the term "component" is intended to be broadly construed as hardware, firmware, or a combination of hardware and software.

Certain user interfaces have been described herein. In some implementations, the user interfaces may be customizable by a user or a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
      obtain a universal label, having a universal labeling scheme, from an Internet of Things (IoT) device,
         the universal label scheme being used for a plurality of different devices in an IoT environment,
            the plurality of different devices including the IoT device,
         the universal labeling scheme including:
            a use flag that indicates a kind of communication used by a smart device of the plurality of different devices,
            a data flow flag that indicates a direction in which the smart device communicates data,
            an economy and lifecycle flag that indicates at least one of:
               a date of service for the smart device,
               an amount of energy used by the smart device, or
               a redundancy mechanism for the smart device, and
            a management and control flag that indicates an administrative requirement for the smart device, and
         the universal label comprising a label header including:
            a first value corresponding to the use flag,
            a second value corresponding to the data flow flag,
            a third value corresponding to the economy and lifecycle flag,
            a fourth value corresponding to the management and control flag; and
            a catalogue value indicating whether at least one of the use flag, the data flow flag, the economy and lifecycle flag, or the management and control flag should be ignored or should be used for management of the IoT device;
      register the IoT device based on obtaining the universal label from the IoT device,
         the universal label being periodically obtained to maintain registration of the IoT device;
      identify the use flag, the data flow flag, the economy and lifecycle flag, and the management and control flag from the universal label based on a data format of the universal labeling scheme;
      determine, based on the first value corresponding to the use flag and the catalogue value, first information indicating a kind of communication used by the IoT device;
      determine, based on the second value corresponding to the data flow flag and the catalogue value, second information indicating a direction in which the IoT device communicates data;
      determine, based on the third value corresponding to the economy and lifecycle flag and the catalogue value, third information indicating at least one of:
         a date of service for the IoT device,
         an amount of energy used by the IoT device, or
         a redundancy mechanism for the IoT device;
      determine, based on the fourth value corresponding to the management and control flag and the catalogue value, fourth information indicating an administrative requirement for the IoT device; and
      manage at least one of the IoT device or the IoT environment based on at least one of:
         the first information,
         the second information,
         the third information, or
         the fourth information.

2. The device of claim 1, where the first information further indicates that the kind of communication is at least one of:
   sending data between machines,
   sending data from a machine to a human,
   sending data from the human to the machine, or
   sending data between humans.

3. The device of claim 1, where the second information further indicates that the IoT device at least one of:
   receives the data, or
   transmits the data.

4. The device of claim 1, where the second information further indicates a location at which to store the data.

5. The device of claim 1,
   where the one or more processors are further to:
      identify the label header from the universal label based on the data format;
      determine, based on the label header, fifth information indicating at least one of:
         a universal label version,
         whether information in the universal label is relevant, or
         whether the universal label is configurable; and
      manage at least one of the IoT device or the IoT environment based on the fifth information.

6. The device of claim 1, where
   the second information further indicates a time period the data is to be stored.

7. The device of claim 1, where the one or more processors are further to:
   obtain a plurality of universal labels from a plurality of IoT devices, the plurality of universal labels including the universal label and the plurality of IoT devices including the IoT device; and
manage the IoT environment based on the plurality of universal labels.

8. The device of claim 7, where each of the plurality of universal labels have a same data format.

9. A computer-readable medium storing instructions, the instructions comprising:
a plurality of instructions that, when executed by a processor of a device, cause the processor to:
receive a universal label, having a universal labeling scheme, from an Internet of Things (IoT) device,
the universal label scheme being used for a plurality of different devices in an IoT environment,
the plurality of different devices including the IoT device,
the universal labeling scheme including:
a use flag that indicates a kind of communication used by a smart device of the plurality of different devices,
a data flow flag that indicates a direction in which the smart device communicates data,
an economy and lifecycle flag that indicates at least one of:
a date of service for the smart device,
an amount of energy used by the smart device, or
a redundancy mechanism for the smart device, and
a management and control flag that indicates an administrative requirement for the smart device, and
the universal label comprising a header including:
a first value corresponding to the use flag,
a second value corresponding to the data flow flag,
a third value corresponding to the economy and lifecycle flag,
a fourth value corresponding to the management and control flag; and
a catalogue value indicating whether at least one of the use flag, the data flow flag, the economy and lifecycle flag, or the management and control flag should be ignored or should be used for management of the IoT device;
register the IoT device based on obtaining the universal label from the IoT device,
the universal label being periodically obtained to maintain registration of the IoT device;
identify the use flag, the data flow flag, the economy and lifecycle flag, and the management and control flag from the universal label based on a data format of the universal labeling scheme;
determine, based on the first value corresponding to the use flag and the catalogue value, first information indicating a type of use for the IoT device;
determine, based on the second value corresponding to the data flow flag and the catalogue value, second information indicating a direction the IoT device communicates data;
determine, based on the third value corresponding to the economy and lifecycle flag and the catalogue value, third information indicating at least one of:
a date of service for the IoT device,
an amount of energy used by the IoT device, or
whether a redundancy mechanism exists for the IoT device;
determine, based on the fourth value corresponding to the management and control flag and the catalogue value, fourth information indicating an administrative requirement for the IoT device; and
manage at least one of the IoT device or the IoT environment based on at least one of:
the first information,
the second information,
the third information, or
the fourth information.

10. The computer-readable medium of claim 9, where the third information further indicates a date of manufacture of the IoT device.

11. The computer-readable medium of claim 9, where the third information further indicates security requirements of the IoT device.

12. The computer-readable medium of claim 9, where the third information further indicates the redundancy mechanism.

13. The computer-readable medium of claim 9, where the third information further indicates that the redundancy mechanism for the IoT device includes storing data, sent from or received by the IoT device, in more than one location.

14. The computer-readable medium of claim 9, where the data format of the universal labeling scheme indicates bits available for future use.

15. The computer-readable medium of claim 9, where a length of each of the use flag, the data flow flag, the economy and lifecycle flag, and the management and control flag is equal to or less than approximately 9 bytes.

16. A method, comprising:
obtaining, by a device, a universal label, having a universal labeling scheme, for an Internet of Things (IoT) device,
the universal label scheme being used for a plurality of different devices in an IoT environment,
the plurality of different devices including the IoT device, the universal labeling scheme including:
a use flag that indicates a kind of communication used by a smart device of the plurality of different devices,
a data flow flag that indicates a direction in which the smart device communicates data,
an economy and lifecycle flag that indicates at least one of:
a date of service for the smart device,
an amount of energy used by the smart device, or
a redundancy mechanism for the smart device, and
a management and control flag that indicates an administrative requirement for the smart device, and
the universal label comprising a header including:
a first value corresponding to the use flag,
a second value corresponding to the data flow flag,
a third value corresponding to the economy and lifecycle flag,
a fourth value corresponding to the management and control flag; and
a catalogue value indicating whether at least one of the use flag, the data flow flag, the economy and lifecycle flag, or the management and control flag should be ignored or should be used for management of the IoT device;
registering, by the device, the IoT device based on obtaining the universal label from the IoT device, the universal label being periodically obtained to maintain registration of the IoT device;

identifying, by the device, the use flag, the data flow flag, the economy and lifecycle flag, and the management and control flag from the universal label based on a data format of the universal labeling scheme;

determining, by the device and based on the first value corresponding to the use flag and the catalogue value, first information indicating at least one of:
- a kind of transmitter from which the IoT device receives data, or
- a kind of receiver to which the IoT device transmits data;

determining, by the device and based on the second value corresponding to the data flow flag and the catalogue value, second information indicating a direction of data flow for the IoT device;

determining, by the device and based on the third value corresponding to the economy and lifecycle flag and the catalogue value, third information indicating at least one of:
- date of manufacture for the IoT device,
- a amount of power used by the IoT device, or
- a backup mechanism for the IoT device;

determining, by the device and based on the fourth value corresponding to the management and control flag and the catalogue value, fourth information indicating an administrative requirement for the IoT device; and managing, by the device, at least one of the IoT device or the IoT environment based on at least one of:
- the first information,
- the second information,
- the third information, or
- the fourth information.

17. The method of claim 16, further comprising:
storing data format information for the data format indicating:
- a quantity of bits for the use flag,
- a quantity of bits for the data flow flag,
- a quantity of bits for the economy and lifecycle flag,
- a quantity of bits for the management and control flag, and
- an order for the use flag, the data flow flag, the economy and lifecycle flag, and the management and control flag; and determining the first information, the second information, the third information, and the fourth information based on the data format information.

18. The method of claim 16, further comprising:
managing the IoT environment by allocating at least one of an amount of bandwidth, an amount of power, or an amount of storage based on the at least one of the first information, the second information, the third information, or the fourth information.

19. The method of claim 16, where the fourth value corresponding to the management and control flag indicates an external device is required for management of the IoT device.

20. The method of claim 16, where the third value corresponding to the economy and lifecycle flag indicates information related to at least one of powering on or powering off the IoT device.

* * * * *